April 15, 1947.                W. J. MORRILL                2,418,980
DYNAMOELECTRIC MACHINE ROTOR ASSEMBLY
Filed Dec. 22, 1944
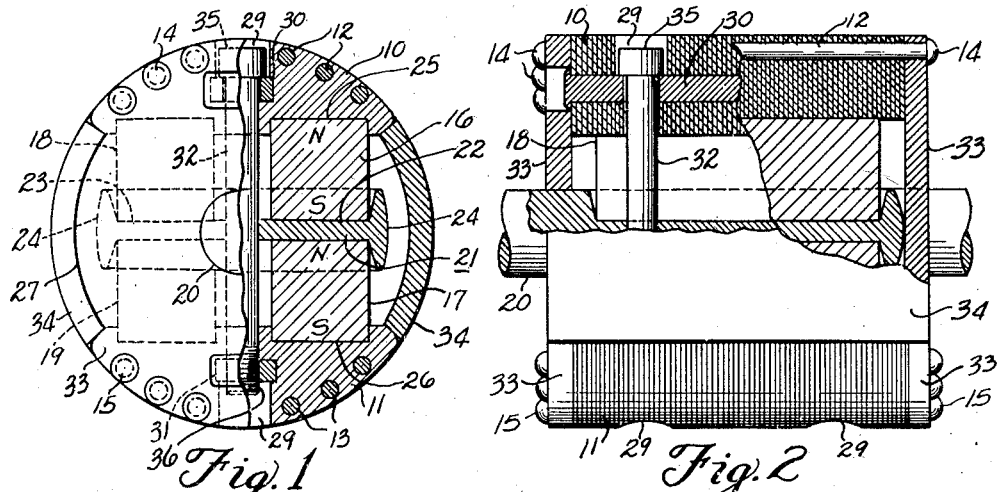
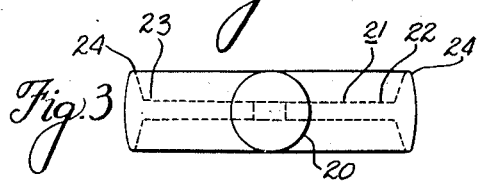
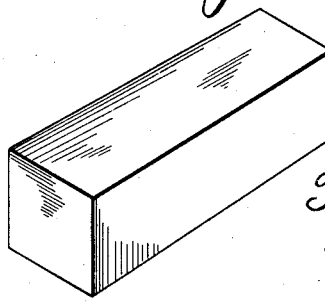
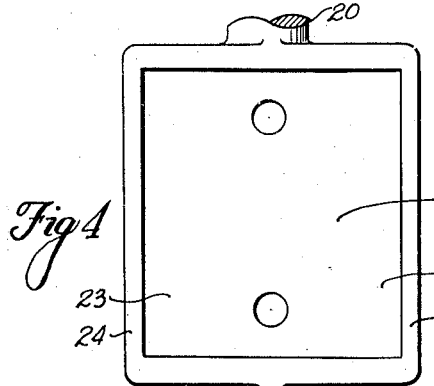
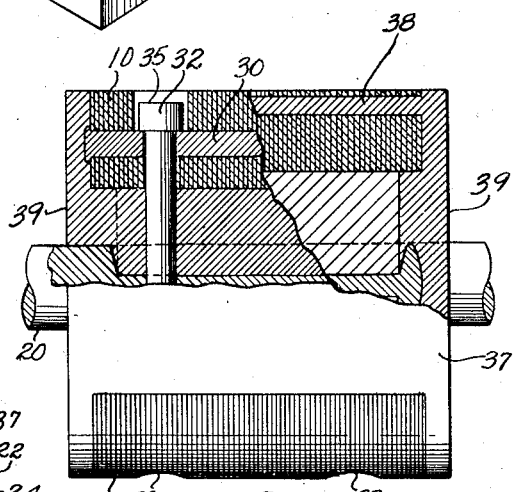
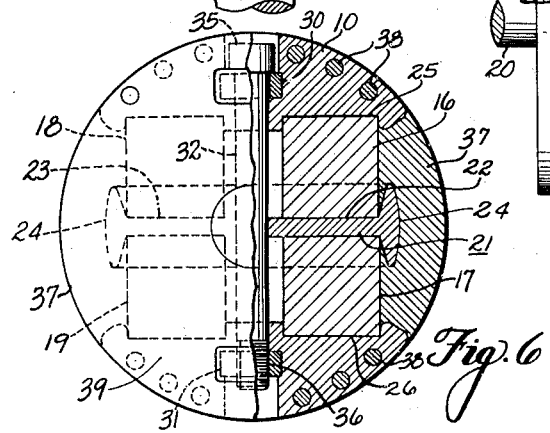
INVENTOR.
Wayne J. Morrill
BY
Stoodling and Krost
attys.

Patented Apr. 15, 1947

2,418,980

UNITED STATES PATENT OFFICE 2,418,980

DYNAMOELECTRIC MACHINE ROTOR ASSEMBLY

Wayne J. Morrill, Fort Wayne, Ind.

Application December 22, 1944, Serial No. 569,311

13 Claims. (Cl. 171—209)

My invention relates in general to rotors for dynamo-electric machines and more particularly to rotors having a permanent magnet field.

The operation of a dynamo-electric machine having a rotor constructed of a permanent magnet field is somewhat different from the operation of a conventional excited machine, in that with the conventional dynamo-electric machine the de-magnetization or the cross-magnetization of the rotor is accompanied by no permanent ill effects. On the other hand, a rotor having a permanent magnet field may be seriously affected by the de-magnetization or the cross-magnetization. The cross-magnetization of a permanent magnet field can readily result in a shifting of the poles and consequently a weakening of the magnet and in a permanent reduction in the generated voltage. The de-magnetization of such a field may also permanently reduce the strength of the magnet and reduce the generated voltage. Such reduction is, of course, the equivalent of a reduction in the effective capacity of the machine, the result being that unless some means for preventing the permanent ill effects of de-magnetization or cross-magnetization is provided, it is necessary to build a considerably larger generator to obtain one having the desired output.

In order to obtain a generator having good voltage regulation characteristics, it is necessary to provide stator windings having relatively low impedance. Such low impedance windings are naturally subject to very heavy currents under over-load and short circuit conditions and a large part of the magnetomotive force produced by the flow of these heavy currents through the stator winding may be applied at right angles to the direction of the permanent magnet flux of the rotor. As a result, the leading pole tip of the rotor is de-magnetized or "knocked down" and, since a trailing pole tip which is subject to over-magnetization is in its original state magnetized as high as possible, the permanent effect of the cross-magnetization is to reduce the total flux of the pole and consequently the generated voltage of the dynamo-electric machine.

It is also possible under certain conditions that most of the magnetomotive force produced by heavy currents in the stator windings may become directly opposed to the permanent magnet flux of the rotor, resulting in a permanent reduction of the magnetic flux of the rotor, the end result being a permanent reduction in the generated voltage of the machine.

An object of my invention is to provide an improved rotor for a dynamo-electric machine, which rotor has permanently built-in features which oppose the de-magnetizing of the permanent magnet field of the rotor.

Another object of my invention is to use a permanent magnet field to its maximum magnetic advantage.

Another object of my invention is to construct the permanent magnet field out of a plurality of permanent magnetic blocks.

Another object of my invention is to construct a rotor of the permanent magnet type whereby the parts may be readily fastened to the shaft of the rotor.

Another object of my invention is the provision of a rotor which will stand a great deal of magnetic abuse without materially demagnetizing the permanent magnet field.

Another object of my invention is the provision of a permanent magnet type of rotor wherein the permanent magnet is maintained at substantially uniform field strength throughout the major portion of the pole faces of the magnet.

Another object of my invention is the provision of a permanent magnet type of rotor in which there is very little magnetic distortion throughout the pole faces of the rotor under conditions of heavy cross-magnetization.

Another object of my invention is the provision of a permanent magnet type of rotor having cores of magnetic material in the region of the pole faces, which magnetic material prevents flux of the stator from penetrating the permanent magnet.

Another object of my invention is the provision of a permanent magnet type of rotor having cores of magnetic material in the region of the pole faces, which magnetic material provides a substantially equipotential surface at the ends of the permanent magnet, thus preventing the disturbing stator space and time harmonics from penetrating to the magnet with consequent de-magnetizing action.

Another object of my invention is the provision of a distributed winding located in the region of the pole faces of the rotor to serve the dual purpose of reducing pole face distortion and of reducing the fluxes which have a relative speed with respect to the rotor.

Another object of my invention is the provision of a rotor construction having a permanent magnet core, which core is substantially free from external fluxes.

Another object of my invention is the provision of a rotor which is adapted to operate within a stator of a dynamo-electric machine and which rotor, because of its construction, produces in the stator substantially only such fluxes as move with respect to the stator at fundamental speed, thereby eliminating harmonics from the stator voltage wave.

Another object of my invention is the provision of a permanent magnet type of rotor which is simple of manufacture and which will stand a great deal of mechanical abuse and which will maintain its magnetic properties throughout a long period of operation.

Other objects and a fuller understanding of my invention may be had by referring to the following description and claims, taken in combination with the accompanying drawing, in which:

Figure 1 is an end view of a rotor embodying the features of my invention, with substantially the right-hand side thereof shown in cross-section;

Figure 2 is an elevational side view of a rotor with substantially the upper half shown in cross-section, the cross-section being taken along a vertical center line;

Figure 3 is an end view of a shaft having outwardly extending wing brackets upon which the permanent magnet field blocks may be mounted;

Figure 4 is a plan view of the shaft shown in Figure 3;

Figure 5 is a perspective view of a permanent magnet block;

Figure 6 is a view similar to Figure 1, but shows a modified form of the construction in that the distributed windings, the short circuited heavy windings, and the end plates or rings are all cast integrally with each other; and Figure 7 is a view similar to Figure 2 but showing the integrally cast distributed winding, the short circuited heavy winding, and the end plates or rings.

With reference to Figures 1 and 2 of the drawing, I illustrate a first core of magnetic material indicated by the reference character 10 and a second core of magnetic material indicated by the reference character 11. These cores comprise substantially a segment of a circle and may be constructed of a plurality of stamped laminations. A distributed winding 12 is provided in the peripheral marginal edge of the first core 10 and a distributed winding 13 is provided around the peripheral marginal edge of the second core 11. The distributed windings 12 may be in the form of rivets having heads 14 and similarly the distributed winding 13 may be in the form of rivets having the heads 15.

The permanent magnet field comprises a plurality of permanent magnet blocks 16, 17, 18 and 19 which are mounted upon an intermediate portion 21 of a shaft 20 for the rotor. As illustrated in Figures 3 and 4, the intermediate portion 21 of the shaft comprises two outwardly extending wing brackets 22 and 23 which have a marginal edge flange 24 extending therearound. The permanent magnet blocks 16 and 17 are mounted on opposite sides of the outwardly extending wing bracket 22 and the permanent magnet blocks 18 and 19 are similarly mounted on opposite sides of the outwardly extending wing bracket 23. The permanent magnet blocks 16 and 17 are magnetically connected in series through the outwardly extending wing bracket 22 and similarly the permanent magnet blocks 18 and 19 are magnetically connected in series through the outwardly extending wing bracket 23. The upper sides of the permanent magnet blocks 16 and 18 are designated in the drawing as the north pole and are arranged to be disposed to be engaged by the lower face 25 of the first core 10. The underneath sides of the permanent magnet blocks 17 and 19 in the drawing are designated as the south poles and are arranged to be disposed to be engaged by the face 26 of the second core 11. That is to say, the faces 25 and 26 constitute opposed faces for engaging respectively the north poles and the south poles of the permanent magnet blocks. In the drawing, I have illustrated a core construction having two poles, but it is to be understood that my invention may be embodied in a core construction having a larger number of poles. The cores 11 and 12 and the permanent magnet blocks are fastened to the intermediate portion 21 of the shaft by means of fastening bolts which extend substantially diametrically through the core construction. The heads 35 of the bolts are adapted to engage a rivet 30 which extends through the laminations of the first core and which holds the laminations together. The heads 35 are adapted to fit into recesses 29 provided in the magnetic core. The threads 36 on the ends of the fastening bolts 32 are adapted to threadably engage a rivet 31 which extends through the laminations of the second core and which holds the laminations together. The tightening of the fastening bolts 32 presses the opposed faces 25 and 26 of the first and second cores respectively against the north pole and the south pole of the permanent magnet blocks. The blocks 16 and 17 constitute a first magnetic path and the blocks 18 and 19 constitute a second magnetic path. The blocks 16 and 17 of the first path are disposed in a side-by-side relation with respect to the blocks 18 and 19 of the second path. As the magnetic cores 10 and 11 are pressed against the permanent magnet blocks, the blocks are in turn pressed against the outwardly extending wing brackets 22 and 23 for holding the assembly rigidly upon the intermediate portion 21 of the shaft. The permanent magnet blocks are prevented from laterally slipping upon the outwardly extending wing brackets since the blocks engage an internal shoulder on both sides of the shaft provided by the marginal edge flange 24. In order to give further rigidity to the entire assembly the opposed faces 25 and 26 may be provided with longitudinal recesses to receive the permanent magnet blocks. The shaft 20 and the rivets 30 and 31 may be constructed of magnetic material whereas the fastening bolts 32 are constructed of non-magnetic material. The entire construction is such that it may be readily assembled upon the intermediate portion 21 of the shaft. By using permanent magnet blocks as illustrated, I am able to simplify the construction of my rotor in that the blocks may be of uniform size and avoid all of the difficulty incident to forming the permanent magnet field in some other shape. Since the permanent magnet field is constructed of a plurality of blocks I am able to use the permanent magnet field to its maximum magnetic advantage which is not the case in other types of construction where the flux of the permanent magnet field is required to pass around a centrally disposed shaft.

The distributed windings 12 and 13 are short circuited by means of end plates or rings 33 against which the heads 14 and 15 engage and make good electrical contact. The permanent magnet blocks are surrounded by a heavy short circuited turn comprising arcuate current conducting plates 34 having their ends connected to the end plates or rings 33. The outside edges of the arcuate current conducting plates 34 overlap the end plates 33 and may be suitably connected thereto by brazing or by silver soldering around the peripheral edge of the end plates. In Figure 1, the silver soldering would be along the arcuate line 27. The distributed windings and the heavy short circuited turn including the end plates are preferably constructed of copper or any other low electrical resistance material to provide a minimum short circuited resistance to the flow of current. The purpose of the heavy short circuited windings comprising the arcuate current conducting plates 34 and the end plates 33 is to prevent de-magnetization of the permanent magnet blocks under transient or short circuit conditions of the stator and it has been determined that the conductivity of this heavy short circuited turn should preferably be approximately equal to or slightly greater than the conductivity of the stator winding when measured with reference to the rotor winding. The permanent magnet blocks 16 and 17 constitute one magnetic path and may be designated as one block means, and the permanent magnet blocks 18 and 19 constitute another magnetic path and may be designated as another block means. In other words, each block means comprises at least two permanent magnet blocks one of which has been illustrated by the perspective view in Figure 5. The heavy short circuited turn surrounds the two magnetic paths comprising the two block means. The flux passes directly through the two block means in a straight line path and there is no interference with the passage of this straight line flux as would be the case with a solid permanent magnet field having a shaft extending therethrough. The action of the heavy short circuited turn to prevent demagnetization of the permanent magnet blocks may best be understood by the following discussion:

If the stator is suddenly short circuited at the time that the rotor flux through it is maximum, the ensuing effects can be understood by use of the well-known principle applying to transients, termed the principle of "constant linkages." According to the principle of constant linkages, the flux linkage in any electro-magnetic structure must remain constant for the first instant following a short circuit because of the induced heavy currents which oppose a change in flux. With this in mind, it will be seen that immediately after a short circuit of the stator at a time approximating maximum rotor flux linkages, the short circuited stator winding will momentarily lock the linked flux in place while the rotor continues to turn first to a position at right angles to the locked flux and then to a position in which the permanent magnet is directly opposed to the locked flux. Under this opposed condition, the tendency would be for the permanent magnet to be directly de-magnetized by the heavy reversed magnetomotive force of the stator and the characteristics of the dynamo-electric machine embodying the rotor would be permanently damaged. When a heavy short circuiting turn of conductivity equal to the referred conductivity of the stator winding is introduced around the permanent magnet of the rotor, the currents which are induced in this heavy short circuited turn tend to maintain the rotor flux at a constant value, and as a result, the magnetomotive force of the heavy rotor short circuiting turn opposes and neutralizes the magnetomotive force of the short circuited stator winding, preventing the permanent magnet rotor core from being de-magnetized. In the event that a short circuit should occur in the stator winding when the rotor flux linkages are substantially zero, a transient of a different type will take place because at that time there exists in the stator winding substantially maximum voltage. At this instant of short circuit, the current in the stator winding will rapidly rise and produce a strong stator magnetomotive force which will again have a demagnetizing effect on the rotor. Under certain conditions this last mentioned transient demagnetizing effect might be expected to be less than that occurring when the rotor flux linkages are maximum.

Because of the necessity, as outlined above, of providing a relatively high conductivity in the heavy short circuited winding, the current conducting plates 34 and the end plates or rings 33 are made relatively thick. As illustrated in the drawing, the outer sides of the permanent magnet blocks 16 and 17 and of the permanent magnet blocks 18 and 19 are disposed a considerable distance from the stator field in which the rotor is mounted and as a result a very large air gap is present in the interpole region of the permanent magnet field which comprises the region between the magnetic cores 10 and 11. Because of this very large air gap no special precautions need to be taken to prevent rotor de-magnetization of the permanent magnet field element in the interpole region.

The magnetic material constituting the cores 10 and 11 through which the distributed windings 12 and 13 extend has the property of distributing the flux emanating from the stator so that the flux which emanates from the stator does not penetrate the permanent magnet core blocks. More specifically, the magnetic material constituting the cores 10 and 11 has the three-fold purpose of constituting a provision of a path for collecting the flux from the permanent magnet blocks and distributing the flux between the current distributed windings, the provision of a by-pass for the cross-magnetizing stator flux thereby preventing the stator flux from entering the permanent magnet core, and the provision of a by-pass for higher harmonic fluxes of the stator which might otherwise penetrate to the permanent magnet core and magnetically churn its surface. Such magnetic churning has a tendency to demagnetize and thus destroy the effectiveness of the permanent magnet core. The advantage of the flux collecting action of the magnetic material constituting the cores 10 and 11 is best appreciated in the light of the characteristics of permanent magnet materials and what is known of their efficient use. The best available permanent magnet materials operate efficiently in dynamo-electric machines when the flux density in the permanent magnet itself is uniform throughout the magnet and the density in the magnet is approximately half that which can be induced in the usual soft magnetic materials, of which the laminated cores are preferably made. The presence of the magnetic material constituting the cores tends to establish an equipotential magnetic surface at the poles of the permanent magnet core and thus tends to produce a uniform magnetic density in the permanent magnet material.

The distributed windings serve the dual purpose of assisting in preventing the "knock-down" or the permanent weakening of the flux in the leading pole tip under short circuit or transient conditions of the stator winding and reducing the magnitude of the third harmonic of voltage which is inherent in single phase alternators. Oscillographic tests show that by the use of these distributed windings the voltage wave of the generator closely approximates a sine wave, even under full load, single phase conditions. The distributed windings assist in preventing permanent distortion or "knock-down" of the permanent magnet flux because of the tendency for each adjacent current conducting bar or rivet to maintain in the intermediately disposed magnet material a constant flux under transient conditions.

My entire assembly may be readily mounted upon the intermediate portion 21 of the shaft simply by mounting the permanent magnet blocks upon the outwardly extending wing brackets, after which the magnetic cores 10 and 11 are disposed against the permanent magnet blocks, the entire assembly then being held together by the fastening bolts 32. Recesses 29 may be provided in both of the magnetic cores 10 and 11 in order to make the cores interchangeable while manufacturing and assembling.

In normal operation of the rotor the speed may be of a very high order and the laminated cores afford protection to the permanent magnet blocks at these very high speeds against the permanent magnet blocks disrupting due to large centrifugal forces. In other words, the laminated cores afford a safety measure in the event that the permanent magnet cores should rupture. The current conducting plates 34 also afford a safety measure in the event that the permanent magnet core blocks should rupture.

In Figures 6 and 7 the end plates 39, the arcuate current conducting plates 37, and the distributed conductor bars 38 are all cast integral about the permanent magnet core blocks and the magnetic cores 10 and 11. In this construction the marginal edge flange 24 constitutes a key to which the cast material may be interlocked. The operation of the device in Figures 6 and 7 is substantially the same as that described with reference to the previous figures of the drawing.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnet means having north and south poles disposed between said opposed faces of the cores with the north pole positioned adjacent the opposed face of one of said cores and the south pole positioned adjacent the opposed face of the other said core, said permanent magnet means providing a space extending from one core to the other, a shaft having an intermediate portion upon which the permanent magnetic means is mounted, means in said space and engaging the said cores for pressing the opposed faces of the said cores upon the poles of the permanent magnetic means, and heavy short circuited winding means surrounding the permanent magnet means intermediate said cores.

2. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate portion, said first and second block means being mounted upon said intermediate portion of the shaft in a side-by-side disposition with a lateral clearance space therebetween, means passing through said clearance space and engaging the said cores for pressing the opposed faces of the said cores upon the poles of the permanent magnetic means, and heavy short circuited winding means surrounding the permanent magnetic means intermediate said cores.

3. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnet means having north and south poles disposed between said opposed faces of the cores with the north pole positioned adjacent the opposed face of one of said cores and the south pole positioned adjacent the opposed face of the other said core, a shaft having an intermediate portion upon which the permanent magnetic means is mounted, means clearing the permanent magnetic means and extending through the intermediate portion of the shaft for pressing the opposed faces of the said cores upon the poles of the permanent magnetic means, heavy short circuited winding means surrounding the permanent magnetic means intermediate said cores, said cores and said heavy short circuited winding means having outer cylindrical surface portions so related to each other as to constitute segmental cylindrical surfaces of substantially the same cylinder.

4. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnet means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate portion constituting substantially outwardly extending wing brackets, said first and second block means being mounted respectively upon said wing brackets in a side-by-side disposition with a lateral space between said first and second block means, means in said space and engaging the said cores for pressing the opposed faces of the said cores upon the poles of the permanent magnetic means, said first block means comprising at least two block elements mounted respectively on opposite sides of one of said wing brackets and being magnetically in series through said wing bracket, said second block means comprising at least two block elements mounted respectively on opposite sides of the other of said wing brackets and being magnetically in series through said wing bracket, and heavy short circuited winding means surrounding the permanent magnetic means intermediate said cores.

5. A rotor for dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate portion constituting substantially outwardly extending wing brackets, said first and second block means being mounted respectively upon said wing brackets in a side-by-side disposition with a lateral space between said first and second block means, means in said space and engaging the said cores for pressing the opposed faces of the said cores upon the poles of the permanent magnetic means, said first block means comprising at least two block elements mounted respectively on opposite sides of one of said wing brackets and being magnetically in series through said wing bracket, said second block means comprising at least two block elements mounted respectively on opposite sides of the other of said wing brackets and being magnetically in series through said wing bracket, and heavy short circuited winding means surrounding the permanent magnetic means intermediate said cores, said cores and said heavy short circuited winding means having outer cylindrical surface portions so related to each other as to constitute segmental cylindrical surfaces of substantially the same cylinder.

6. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate portion constituting substantially outwardly extending wing brackets, said first and second block means being mounted respectively upon said wing brackets in a side-by-side disposition with a lateral space between said first and second block means, means in said space and engaging the said cores for pressing the opposed faces of the said cores upon the poles of the permanent magnetic means, said first block means comprising at least two block elements mounted respectively on opposite sides of one of said wing brackets and being magnetically in series through said wing bracket, said second block means comprising at least two block elements mounted respectively on opposite sides of the other of said wing brackets and being magnetically in series through said wing bracket, and heavy short circuited winding means surrounding the permanent magnetic means intermediate said cores, said short circuited distributed winding and said heavy short circuited winding means including end rings disposed on the ends of the rotor.

7. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate portion constituting substantially outwardly extending wing brackets, said first and second block means being mounted respectively upon said wing brackets in a side-by-side disposition with a lateral space between said first and second block means, means in said space and engaging the said cores for pressing the opposed faces of the said cores upon the poles of the permanent magnetic means, said first block means comprising at least two block elements mounted respectively on opposite sides of one of said wing brackets and being magnetically in series through said wing bracket, said second block means comprising at least two block elements mounted respectively on opposite sides of the other of said wing brackets and being magnetically in series through said wing bracket, and heavy short circuited winding means surrounding the permanent magnetic means intermediate said cores, said short circuited distributed winding and said heavy short circuited winding means including end rings integrally cast therewith and disposed on the ends of the rotor.

8. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate portion constituting substantially outwardly extending wing brackets, said first and second block means being mounted respectively upon said wing brackets in a side-by-side disposition with a lateral space between said first and second block means, means in said space and engaging the said cores for pressing the opposed faces of the said cores upon the poles of the permanent magnetic means, said first block means comprising at least two block elements mounted respectively on opposite sides of one of said wing brackets and being magnetically in series through said wing bracket, said second block means comprising at least two block elements mounted respectively on opposite sides of the other of said wing brackets and being magnetically in series through said wing bracket, and heavy short circuited winding means surrounding the permanent magnetic means intermediate said cores, said short circuited distributed winding and said heavy short circuited winding means including end rings integrally cast therewith and disposed on the ends of the rotor, said wing brackets having keying portions about which said short circuited winding means may be cast.

9. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means disposed side-by-side with a space therebetween, means in said space and engaging the said cores for pressing the opposed faces of the said cores upon the poles of the permanent magnetic means, heavy short circuited winding means surrounding the permanent magnetic means intermediate said cores, and a shaft for said rotor.

10. A rotor for a dynamo-electric machine, said rotor comprising in combination, a first core of magnetic material having a short circuited distributed winding carried thereby, a second core of magnetic material having a short circuited distributed winding carried thereby, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means disposed side-by-side with a space therebetween, means in said space and engaging the said cores for pressing the opposed faces of the said cores upon the poles of the permanent magnetic means, heavy short circuited winding means surrounding the permanent magnetic means intermediate said cores, and a shaft for said rotor, said cores and said heavy short circuited winding means having outer cylindrical surface portions so related to each other as to constitute segmental cylindrical surfaces of substantially the same cylinder.

11. A rotor for a dynamo-electric machine, said rotor comprising, in combination, a first core of magnetic material having a short circuited distributed winding carried thereby, a second core of magnetic material having a short circuited distributed winding carried thereby, said cores having opposed faces, permanent magnet means having north and south poles disposed between said opposed faces of the cores with the north pole positioned adjacent the opposed face of one of said cores and the south pole positioned adjacent the opposed face of the other said core, a shaft, means for removably mounting said permanent magnet means on said shaft, fastening means for securing said cores and said permanent magnetic means to said shaft, and heavy short circuited winding means surrounding the permanent magnetic means intermediate said cores, said fastening means clearing the permanent magnet means and comprising an element extending substantially diametrically through the shaft and engaging the cores.

12. A rotor for a dynamo-electric machine, said rotor comprising, in combination, a first core of magnetic material having a short circuited distributed winding carried thereby, a second core of magnetic material having a short circuited distributed winding carried thereby, said cores having opposed faces, permanent magnet means having north and south poles disposed between said opposed faces of the cores with the north pole positioned adjacent the opposed face of one of said cores and the south pole positioned adjacent the opposed face of the other said core, a shaft, said permanent magnet means having removable parts mounted on said shaft, fastening means for securing said cores and said permanent magnetic means to said shaft, and heavy short circuited winding means surrounding the permanent magnetic means intermediate said cores, said fastening means clearing the permanent magnet means and comprising an element extending substantially diametrically through the shaft and engaging the cores.

13. A rotor for a dynamo-electric machine, said rotor comprising in combination, a first core of magnetic material, a second core of magnetic material, said cores having opposed faces, permanent magnetic means having north and south poles disposed between said opposed faces of the cores with the north pole positioned adjacent the opposed face of one of said cores and the south pole positioned adjacent the opposed face of the other said core, said permanent magnet means comprising at least first block means and second block means, a shaft having an intermediate mounting section having outwardly extending mounting portions, said first and second block means being mounted respectively upon said mounting portion in a side-by-side disposition with a lateral space between said first and second block means, means in said space and engaging the said cores for pressing the opposed faces of the said cores upon the poles of the permanent magnetic means, said first block means comprising at least two block elements mounted respectively on opposite sides of one of said mounting portions and being magnetically in series through said mounting portion, said second block means comprising at least two block elements mounted respectively on opposite sides of the other of said mounting portions and being magnetically in series through said mounting portion.

WAYNE J. MORRILL.

REFERENCES CITED

The following references are of record in the file of this patent:

UNITED STATES PATENTS

| Number | Name | Date |
| --- | --- | --- |
| 676,276 | Reist | June 11, 1901 |
| 993,635 | Remy | July 25, 1911 |
| 1,953,131 | Reis | Apr. 3, 1934 |
| 2,060,259 | Spengler | Nov. 10, 1936 |
| 2,152,918 | Reis | Apr. 4, 1939 |
| 2,193,675 | Merrill | Mar. 12, 1940 |
| 2,257,824 | Tognola | Oct. 7, 1941 |

FOREIGN PATENTS

| Number | Country | Date |
| --- | --- | --- |
| 463,813 | British | Apr. 7, 1937 |